United States Patent
Hochman

(10) Patent No.: US 6,738,163 B2
(45) Date of Patent: *May 18, 2004

(54) METHOD FOR TRANSMISSION OF FACSIMILE IMAGE DATA

(76) Inventor: Gary Hochman, 17 Windsor Dr., Muttontown, NY (US) 11753

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,303

(22) Filed: Jul. 17, 1998

(65) Prior Publication Data

US 2002/0054358 A1 May 9, 2002

(51) Int. Cl.[7] .................................................. H04N 1/00
(52) U.S. Cl. ...................................... 358/434; 358/1.15
(58) Field of Search ................................ 358/434, 1.15, 358/402, 442, 33.07, 186; 379/93.07; 395/186; 370/428

(56) References Cited

U.S. PATENT DOCUMENTS

| | | | | |
|---|---|---|---|---|
| 5,206,743 A | * | 4/1993 | Hochman et al. | 358/440 |
| 5,420,692 A | * | 5/1995 | Lin et al. | 358/426 |
| 5,808,751 A | | 9/1998 | Hockman | 358/400 |
| 5,809,116 A | * | 9/1998 | Cairo | 379/93.07 |
| 5,838,461 A | * | 11/1998 | Hsieh | 358/442 |
| 5,838,685 A | * | 11/1998 | Hochman | 370/428 |
| 5,859,967 A | * | 1/1999 | Kaufeld et al. | 395/186 |
| 5,864,870 A | * | 1/1999 | Guck | 707/104 |
| 5,881,233 A | * | 3/1999 | Toyoda et al. | 395/200.48 |
| 5,920,404 A | | 7/1999 | Weiser | 358/434 |
| 5,958,016 A | * | 9/1999 | Chang et al. | 709/229 |
| 6,023,779 A | * | 2/2000 | Fullam et al. | 714/751 |
| 6,025,931 A | * | 2/2000 | Bloomfield | 358/402 |
| 6,404,513 B1 | * | 6/2002 | Denker | 358/407 |

* cited by examiner

Primary Examiner—Thomas D. Lee
(74) Attorney, Agent, or Firm—Schweitzer Cornman Gross & Bondell LLP

(57) ABSTRACT

A method for transmission of facsimile messages comprises the use of a plurality of transmission modalities to allow coupling of a conventional facsimile apparatus to remote equipment. A facsimile transmission is made to a point of presence facility. The facsimile transmission includes identification of the ultimate recipient for the transmission. The point of presence facility identifies the recipient, and re-transmits received facsimile image information to the recipient in a format appropriate for the recipient. In a particularly preferred embodiment, the recipient's address is identified as an e-mail address, and the point of presence facility converts the facsimile data to an e-mail-compatible format. Data initially transmitted in a non-facsimile format for ultimate reception by a facsimile apparatus may be similarly received by a point of presence facility, converted to the facsimile format, and transmitted to the recipient, as identified by address information accompanying the initial transmission to the point of presence facility. Confirmation signals may be generated by the point of presence facility to advise a sender of a successful re-transmission.

6 Claims, 1 Drawing Sheet

METHOD FOR TRANSMISSION OF FACSIMILE IMAGE DATA

The present invention relates to a new and improved methodology for the transmission of facsimile messages.

BACKGROUND OF THE INVENTION

Facsimile transmission has been well established and documented. In accordance with conventional technology, a facsimile apparatus, whether a stand-alone or dedicated unit or a personal computer configured with the capability of sending and receiving facsimile messages, is coupled to the telephone line. The entry of the telephone number associated with the recipient's equipment, and the dialing thereof to initiate communication therewith, commences the exchange of so-called "handshake" data permitting the subsequent transfer of an electronic image of the desired information from the sender to the recipient's apparatus. Because both the sender and the recipient's apparatus are typically interfaced to public telephone systems, which are themselves capable of interconnection, worldwide facsimile transmission over such telephone systems is routine.

In U.S. Pat. No. 5,206,743 there is disclosed methodology by which identification and routing data may be transmitted from the sender to the recipient as part of the handshake protocol to permit internal routing of the facsimile data. Such routing may be appropriate, for example, when the apparatus associated with the recipient's telephone number is a local area network. Inclusion of such routing information permits the received facsimile to be subsequently transmitted, over the LAN, after initial reception to the intended recipient's location.

Alternative methods also exist for the routing of facsimile data through a recipient network. For example, DID (Direct Inward Dialing) telephone systems allow a telephone number, associated with a group or block of numbers assigned to a particular location or entity, to be further associated with particular individual or location within the entity. An inward-bound facsimile call, directed by the recipient's otherwise conventional DID telephone number, allows the facsimile to be directly received by a facsimile unit associated with that number.

Alternatively, a series of DTMF (Dual-Tone Multiple Frequency) signals may be entered by the sender after a primary conventional telephone number is dialed and a connection established with apparatus at the receiving number. The entry of such tones constitute a routing code recognized by equipment at the answering telephone number's location which directs the call (or facsimile transmission) to the recipient or apparatus associated with the routing code.

All the foregoing methods, however, require the establishment of a direct primary telephone link between the sender and recipient. When the sender and recipients are geographically separated, the costs of establishing such a link over public commercial telephone lines and systems may be great.

In addition, such conventional technology requires that the facsimile data format be preserved throughout the transmission. A compatible facsimile unit must ultimately receive the transmitted data.

It is accordingly the purpose of the present invention to provide a methodology by which facsimile messages may be transmitted between a sender and a recipient in a manner which facilitates and economizes the use of such communication media over extended distances.

Yet a further purpose of the present invention is to provide a facsimile transmission methodology which is capable of utilizing the internet and other diverse communications media.

Still a further purpose of the present invention is to provide a facsimile transmission methodology which does not require a recipient facsimile unit to be compatible with that of the sending party.

BRIEF DESCRIPTION OF THE INVENTION

In accordance with the foregoing and other objects and purposes, the present invention utilizes conventional telephone lines to transmit facsimile data inputted at the sender's location to a local "point of presence" facility. The point of presence facility receives the facsimile data along with information identifying the address of the ultimate recipient. As used herein, the term "address" means an identification of the recipient which can be accessed electronically for the "deposit" or "last mile delivery" of the transmission. An address may be a telephone number associated with a reception device, such as a facsimile apparatus, an e-mail address, or the like. The point of presence facility converts the received facsimile data to an alternative format; the data is then re-transmitted by the point of presence facility to the intended recipient's address or to a remote point of presence facility proximate the intended recipient. If the transmission is not directly to the recipient's address, the remote point of presence facility subsequently re-transmits the facsimile data to the address. Typically, such "last mile" transmission may be over telephone lines, as a conventional facsimile transmission to the recipient's facsimile reception apparatus. When delivered, an appropriate confirmation signal may be provided to the sender.

The transmission between the point of presence facilities can be over any appropriate communication system. In addition, the point of presence facilities may have the capability of converting the facsimile data to other formats as may be requested by the sender or intended recipient to facilitate ultimate receipt and use.

BRIEF DESCRIPTION OF THE DRAWING

A fuller understanding of the present invention will be obtained upon consideration of the following detailed description of illustrative embodiments thereof in connection with the annexed FIG. 1, which is a block diagram of a facsimile transmission system utilizing the methodology of the present invention.

DETAILED DESCRIPTION OF THE INVENTION

Figure 1:
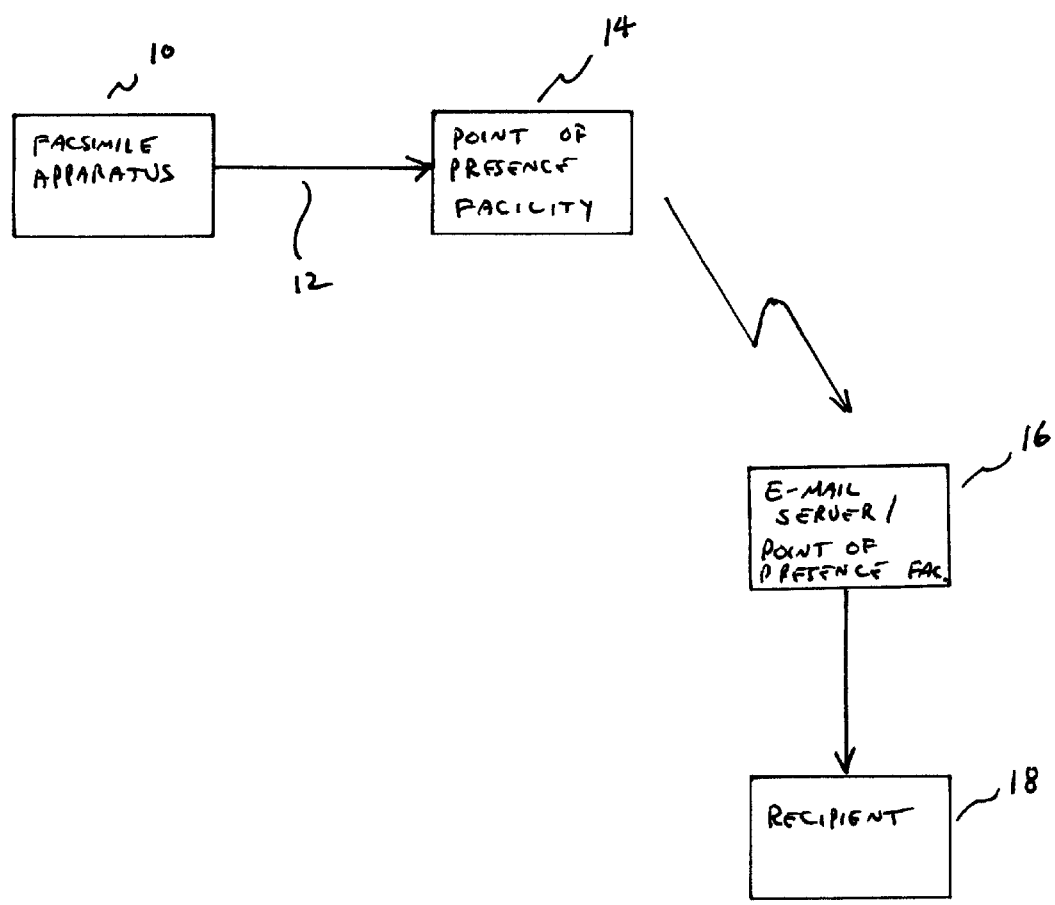

As shown in FIG. 1, a sender's facsimile apparatus 10, whether a stand-alone device or a personal computer having facsimile capability, establishes initial telephone communication in a conventional manner over commercial telephone line 12 to point of presence facility 14. Point of presence facility 14 includes both a facsimile receiver which is coupled to the telephone line 12 to receive an incoming facsimile transmission, as well as processing and storage means to recognize and accommodate both routing information which accompanies the facsimile image data as well as the facsimile data itself. The point of presence facility is typically located (either geographically or telephonically) such that the costs associated with a telephonic connection between facsimile machine 10 and the point of presence facility 14 is minimal.

Upon reception of a facsimile transmission from the sender's fax machine 10, the address of the intended recipient is identified from information accompanying the facsimile transmission. In a particularly preferred form, such information may be in a data field transmitted from the sender to the recipient as part of the handshake procedure associated with the initiation of communications between the transmitting facsimile apparatus and the point of presence reception apparatus. Facsimile apparatuses operating under conventional methodology provide only for a limited amount of additional data transfer as part of the handshake procedure beyond the data conventionally required to properly commence a transmission. Accordingly, the present invention contemplates the inclusion of an extended data frame on the order of 64 characters to accommodate the information needed. Such an extended and additional frame can be identified and utilized by facsimile transmission systems and telephone line modems which are driven and controlled by user-definable software. Use of such methodology would permit the seamless integration of the extended frame into a facsimile transmission as required.

The extended frame utilized in the handshake data transfer may preferably include an address identification of the sender as well as the recipient. In a particularly preferred embodiment of the invention the address of the recipient may be the recipient's e-mail address. The provision of an e-mail address allows the delivering of the facsimile data in the form of an e-mail "attachment" to the identified mailbox location. In addition, use of an e-mail address facilitates the integration of the present invention with known e-mail transmission modalities. The inclusion of the point of presence facility to couple the sender's facsimile apparatus to the recipient's e-mail mailbox permits delivery thereto from a sender not having direct e-mail transmission capabilities, thus substantially expanding the communication universe available to the user of a conventional facsimile device, and providing "virtual" e-mail capabilities to such devices.

Upon identification and inspection of the intended recipient's e-mail address, the point of presence facility 14 generates an e-mail message having the facsimile data presented as an attachment thereto. Presenting the data as an attachment maintains its original layout and format, allowing it to be received by the recipient and viewed in a manner akin to a facsimile transmission otherwise sent in a conventional manner. Because it is often presently impossible to transmit an e-mail attachment without an e-mail "body" associated therewith, point of presence facility 14 would further generate an appropriate e-mail communication to which the facsimile message can be attached, if only in the form of a message to the recipient that a facsimile transmission is being provided in the form of an attachment to the e-mail itself. Alternatively, the facsimile data can be converted to another format. Instructions to the point of presence facility controlling such conversion, appropriate for the intended recipient, can also be placed in the extended data frame or elsewhere in the transmission as appropriate.

The point of presence facility 14 then generates and transmits the e-mail message, including the attachment, in the conventional manner to e-mail server 16 associated with the e-mail address of the recipient. The e-mail server may be viewed as a second point of presence facility. The server can then alert recipient 18 of an e-mail delivery, or the recipient can check his e-mail mailbox to determine if a transmission has been received. The recipient then downloads the e-mail message in a conventional manner. Inherent in the transmission from the point of presence facility 14 to e-mail/point of presence facility 16 are the necessary requirements for locating and identifying the specific server to which the e-mail message is to be routed, and attending to such routing. Such procedures are known and established in the art.

Because the facsimile document is transmitted as part of an e-mail message, documentation, logging and the like presently available and operating with respect to e-mail communication are applicable to the transmission. In addition, because the extended header may also include an address identification of the sender, that information may be utilized to provide a further confirmation notice to the sender of the completion of the e-mail transmission. For example, if the address of the sender is an e-mail address, upon transmission of the e-mail the point of presence 14 facility can generate an e-mail message to the sender's mailbox confirming delivery. Alternatively, if the address is a telephone number, an appropriate communication can be issued in an automated manner. Accompanying the inclusion of the sender's address would be data indicating the nature of the address. For example, it would be necessary to separately identify whether a provided telephone number address is a voice or facsimile-reception device. Similarly, an appropriate identifier field can be provided to classify an address as an e-mail address.

It is to be recognized that the point of presence facility 16 may be either configured as a portal allowing subsequent e-mail transmission globally, or may be a portal associated with a private network. For example, a corporation may provide one or more points of presence, each coupled to its corporate network, to permit third parties facsimile transmission access to the e-mail or other addresses of its employees. Passing facsimile data in this manner allows corporate documentation, record keeping and file handling to be implemented for such facsimile transmissions. Indeed, in a corporate point of presence facility, provision can be further provided for reception and printing of a particular facsimile in the conventional manner at the point of presence, either coupled with or in lieu of further internal e-mail or other format transmission.

Particularly in a corporate environment, other instructions can be sent in the extended data frame. In association with appropriate routing, information regarding the number of pages and collation methodology, or sorting or routing individual pages to individual recipients, can be provided. In addition, the extended frame may provide instruction to the point of presence facility that the facsimile data should be converted to an alternative format. Still further, the point of presence facility can have the capability of determining a preferred format for subsequent transmission based upon information accessible to it associated with the particular intended recipient.

The use of a point of presence facsimile server can also provide audit trails, confirmation of e-mail, and archival capabilities via existing e-mail universal mail boxes. Sub-addressing frames can be used to provide information to tie into any of such applications and features.

The use of an extended field which includes the address of the sender can provide for enhanced return message handling capabilities. Use of an e-mail address of the sender can facilitate the delivery of confirmation messages by the point of presence facility, and can also serve as a depository for facsimile or other messages transmitted by recipients or others to the sender. The sender's e-mail address mailbox can be accessed by the sender in a conventional manner, if the sender has the capability. The sender need not have e-mail reception capability to utilize such a feature, however. The sender can be provided with a password which would allow the sender to request a service provider, such as the point-of-presence facility, to access the sender's e-mail mailbox and download its contents in the form of, for example, facsimile messages which would be delivered over the telephone lines to the sender's facsimile apparatus. The recipient's telephone number can be as previously provided to the service provider, or can be a number entered by the sender when accessing the e-mail mailbox, in a manner similar to "fax-back" services presently available.

The present invention substantially expands the capabilities of facsimile apparatus, allowing the user of such an apparatus access to an enhanced universe of recipients. In addition, it allows the facsimile apparatus to receive communications from a similarly enhanced universe of communication senders. Those skilled in the art will thus be capable of appreciating that other embodiments and implementations of the invention may be envisioned without departing from the scope of the invention as set forth herein.

I claim:

1. A method for the transmission of facsimile-format image data from a sender to a recipient, comprising the steps of:

creating a facsimile-format data file having a facsimile-format image portion and an associated handshake data portion for implementing a handshake procedure with a receiver, the data file being capable of being processed by a conventional facsimile receiver, and entering identifying data for at least one intended recipient for the image data file at the location of the sender, the identifying data comprising routing and audit information;

inserting the identifying data into at least one data frame of the associated handshake data portion;

transmitting the data file over a telephone system from the sender's location to an intermediate point of presence facility using the handshake procedure;

receiving the data transmission by the point of presence facility, recovering the identifying data from the handshake data frame, and utilizing the identifying data to establish a recipient delivery address for the facsimile-format data; and re-transmitting data comprising the facsimile image portion to the delivery address of the recipient.

2. The method of claim 1 wherein the delivery address of the recipient is an e-mail address and the step of re-transmitting the data includes forwarding the data in the form of an e-mail attachment to the recipient's e-mail address.

3. The method of claim 1 further including the steps of:

generating a confirmation message by the point of presence facility after re-transmitting the data comprising the facsimile image portion to the recipient's identified address; and allowing the sender access to the confirmation message.

4. The method of claim 1 further including the steps of:

inserting at the location of the sender data identifying an address of the sender into a handshake data frame;

recovering the address identifying data from the handshake data frame at the point of presence facility and utilizing the address identifying data to establish the address of the sender; and sending a confirmation message to the senders address by the point of presence facility after re-transmitting the data comprising the facsimile image portion to the recipient's delivery address.

5. The method of claim 4, wherein the delivery address of the recipient is an e-mail address and the step of re-transmitting the data includes forwarding the data in the form of an e-mail attachment to the recipient's e-mail address.

6. The method of claim 5, wherein the address of the sender is an e-mail address and the step of sending a confirmation message includes forwarding an e-mail message to the senders e-mail address.

* * * * *